US009395517B2

(12) United States Patent
Um

(10) Patent No.: US 9,395,517 B2
(45) Date of Patent: Jul. 19, 2016

(54) LENS ASSEMBLY AND CAMERA MODULE

(75) Inventor: Kee Tae Um, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 669 days.

(21) Appl. No.: 13/327,082

(22) Filed: Dec. 15, 2011

(65) Prior Publication Data

US 2012/0194923 A1    Aug. 2, 2012

(30) Foreign Application Priority Data

Jan. 31, 2011  (KR) ........................ 10-2011-0009832

(51) Int. Cl.
*G02B 9/00*   (2006.01)
*G02B 13/00*  (2006.01)

(52) U.S. Cl.
CPC .......... *G02B 13/003* (2013.01); *G02B 13/0085* (2013.01)

(58) Field of Classification Search
CPC ...... G02B 3/00; G02B 27/0025; G02B 5/005; G02B 27/58; G02B 13/00; G02B 13/04; G02B 13/06; G02B 13/16; G02B 1/043; B29L 2011/0016; B29D 11/00413; C08F 220/28; C08L 1/00; C08L 3/11
USPC ................. 359/642, 733, 738, 740; 264/1.32; 523/106, 168
See application file for complete search history.

(56) References Cited

U.S. PATENT DOCUMENTS

| 2002/0196563 A1* | 12/2002 | Itoh ............................... 359/741 |
| 2003/0067688 A1* | 4/2003 | Wang ............................ 359/652 |
| 2006/0197862 A1 | 9/2006 | Lung |
| 2008/0084619 A1* | 4/2008 | Lee ............................... 359/820 |
| 2009/0050946 A1 | 2/2009 | Duparre et al. |
| 2011/0038065 A1 | 2/2011 | Miyawaki et al. |
| 2011/0085070 A1 | 4/2011 | Kang et al. |
| 2011/0114883 A1 | 5/2011 | Murouchi et al. |
| 2011/0216238 A1* | 9/2011 | Fujii et al. .................... 348/374 |

FOREIGN PATENT DOCUMENTS

| JP | 6-320788 A | 11/1994 |
| JP | 08-041220 A | 2/1996 |
| JP | 2004-201990 A | 7/2004 |
| JP | 2004361438 A | 12/2004 |
| JP | 2006246461 A | 9/2006 |
| JP | 2007208793 A | 8/2007 |
| JP | 2007-313767 A | 12/2007 |
| JP | 2008-070484 A | 3/2008 |
| JP | 2008508545 A | 3/2008 |
| JP | 2008122801 A | 5/2008 |
| JP | 2008-242310 A | 10/2008 |
| JP | 2009-053528 A | 3/2009 |

(Continued)

OTHER PUBLICATIONS

Final Office Action dated Oct. 15, 2013 in Japanese Application No. 2012-013993, filed Jan. 26, 2012.

(Continued)

*Primary Examiner* — James Greece
(74) *Attorney, Agent, or Firm* — Saliwanchik, Lloyd & Eisenschenk

(57) ABSTRACT

Disclosed are a lens assembly and a camera module. The lens assembly includes a lens unit and a spacer provided at an upper portion or a lower portion of the lens unit. The spacer includes polymer having the glass transition temperature of about 140° C. to about 500° C.

18 Claims, 7 Drawing Sheets

(56) References Cited

FOREIGN PATENT DOCUMENTS

| | | | |
|---|---|---|---|
| JP | 2009186756 A | 8/2009 | |
| JP | 2009242456 A | 10/2009 | |
| JP | 2009-544226 A | 12/2009 | |
| JP | 3160406 U | 6/2010 | |
| JP | 2010286544 A | 12/2010 | |
| KR | 10-2008-0032553 A | 4/2008 | |
| KR | 10-2009-0004705 A | 1/2009 | |
| WO | WO-2008/011003 A2 | 1/2008 | |
| WO | WO 2008011003 A2 | * | 1/2008 |
| WO | WO-2009128519 A1 | 10/2009 | |
| WO | WO-2011/010510 A1 | 1/2011 | |

OTHER PUBLICATIONS

Final Office Action dated Feb. 12, 2014 in Japanese Application No. 2012-013993.

Office Action dated Jun. 18, 2013 in Japanese Application No. 2012-013993, filed Jan. 26, 2012.

Notice of Allowance dated Mar. 20, 2013 in Korean Application No. 10-2011-0009832, filed Jan. 31, 2011.

Office Action dated Sep. 11, 2012 in Korean Application No. 10-2011-0009832, filed Jan. 31, 2011.

Office Action dated Jul. 14, 2015 in Japanese Application No. 2014-10216.

* cited by examiner

LENS ASSEMBLY AND CAMERA MODULE

CROSS-REFERENCE TO RELATED APPLICATION

This application claims the benefit under 35 U.S.C. §119 of Korean Patent Application No. 10-2011-0009832, filed Jan. 31, 2011, which is hereby incorporated by reference in its entirety.

BACKGROUND

The embodiment relates to lens assembly and a camera module.

Recently, as a mobile appliance such as a cellar phone equipped with a camera has been introduced, still images and moving pictures can be taken regardless of time and location.

In addition, for high-resolution and high-quality photographs, the performance of the camera has been gradually improved, and a camera module having an auto-focusing function, a close-up shot function, and an optical zoom-in/zoom-out function has been mounted.

BRIEF SUMMARY

According to the embodiment, a lens assembly includes a lens unit, and a spacer at an upper portion or a lower portion of the lens unit. The spacer includes polymer having a glass transition temperature of about 140° C. to about 500° C.

According to the embodiment, a camera module includes a first lens unit, a second lens unit on the first lens unit, and a first spacer interposed between the first and second lens units. The first spacer includes polyimide.

According to the embodiment, a camera module includes a first lens unit, a second lens unit on the first lens unit, and a spacer interposed between the first and second lens units. The spacer includes a frame part, and a polymer part surrounding the frame part.

DETAILED DESCRIPTION

Figure 1:
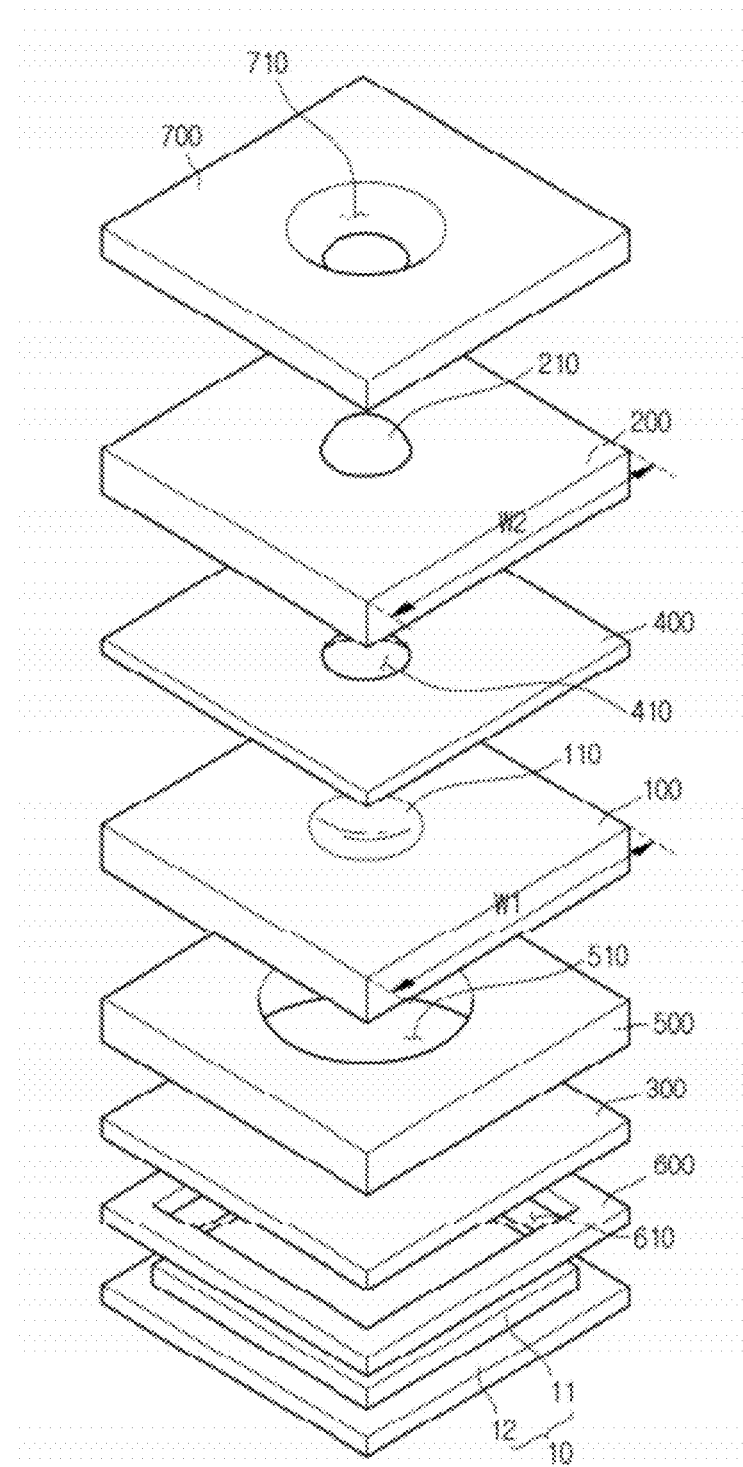
FIG. 1 is an exploded perspective view showing a camera module according to the embodiment.

The embodiment provides a lens assembly having high heat resistance and improved optical characteristics and a camera module including the same.

According to the embodiment, a lens assembly includes a lens unit, and a spacer at an upper portion or a lower portion of the lens unit. The spacer includes polymer having a glass transition temperature of about 140° C. to about 500° C.

According to the embodiment, a camera module includes a first lens unit, a second lens unit on the first lens unit, and a first spacer interposed between the first and second lens units. The first spacer includes polyimide.

According to the embodiment, a camera module includes a first lens unit, a second lens unit on the first lens unit, and a spacer interposed between the first and second lens units. The spacer includes a frame part, and a polymer part surrounding the frame part.

According to the embodiment, the lens assembly and the camera module include polymer representing a high glass transition temperature. In addition, the lens assembly and the camera module according to the embodiment include polyether ether ketone, polytetrafluoroethylene, polyimide, or liquid crystal polymer representing high heat resistance.

Therefore, the lens assembly and the camera module according to the embodiment have high heat resistance. Therefore, the camera module according to the embodiment can be bonded to a main circuit board through a high-temperature reflow process. In this case, since the camera module according to the embodiment has high heat resistance, the camera module is not deformed in the reflow process.

In addition, since the spacer is opaque, the spacer can block undesirable light while spacing the first lens unit apart from the second lens unit. Therefore, the lens assembly according to the embodiment has an improved optical characteristic.

Hereinafter, a lens assembly and a camera module according to the embodiment will be described with reference to accompanying drawings. In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
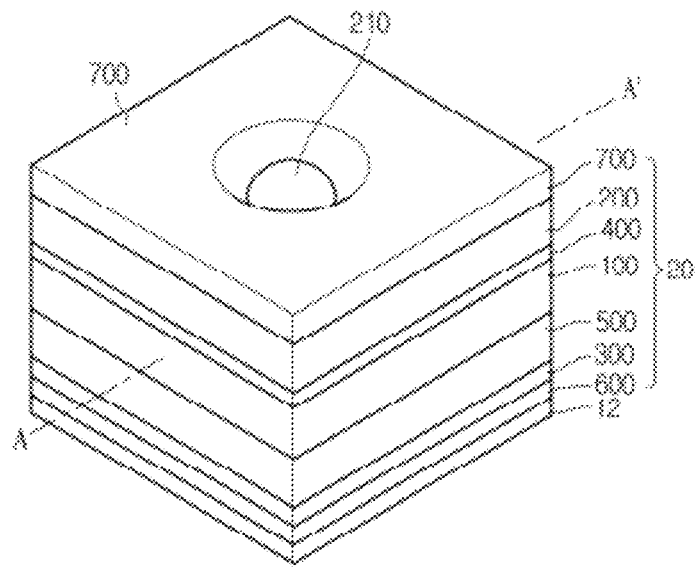
FIG. 2 is a perspective view showing the camera module according to the embodiment.
Figure 3:
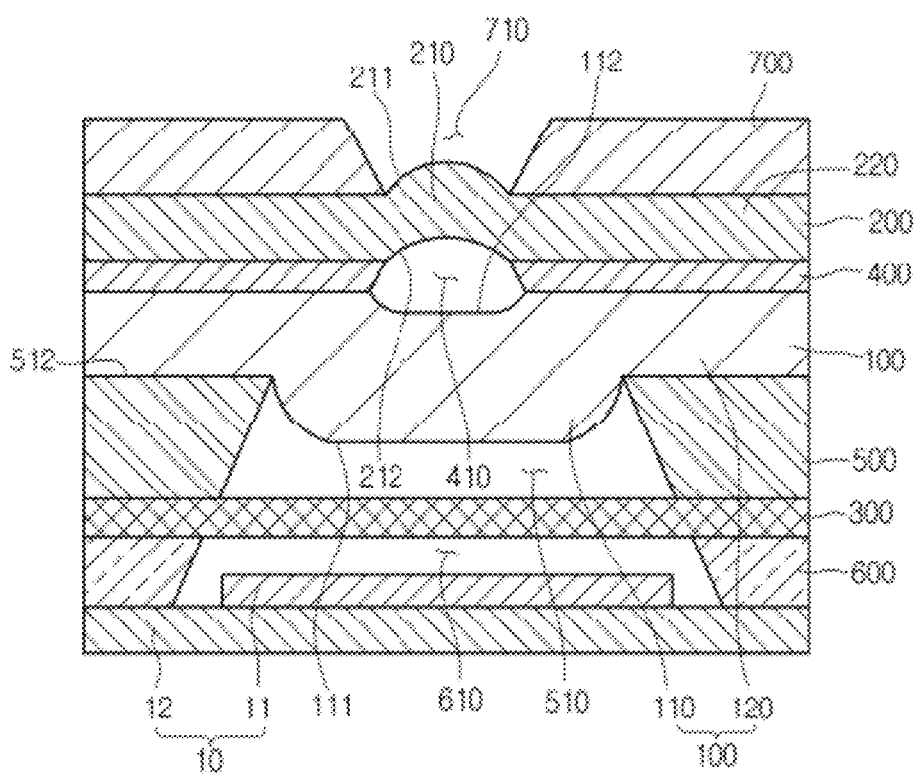
FIG. 3 is a sectional view taken along line A-A' of FIG. 2.
Figure 4:
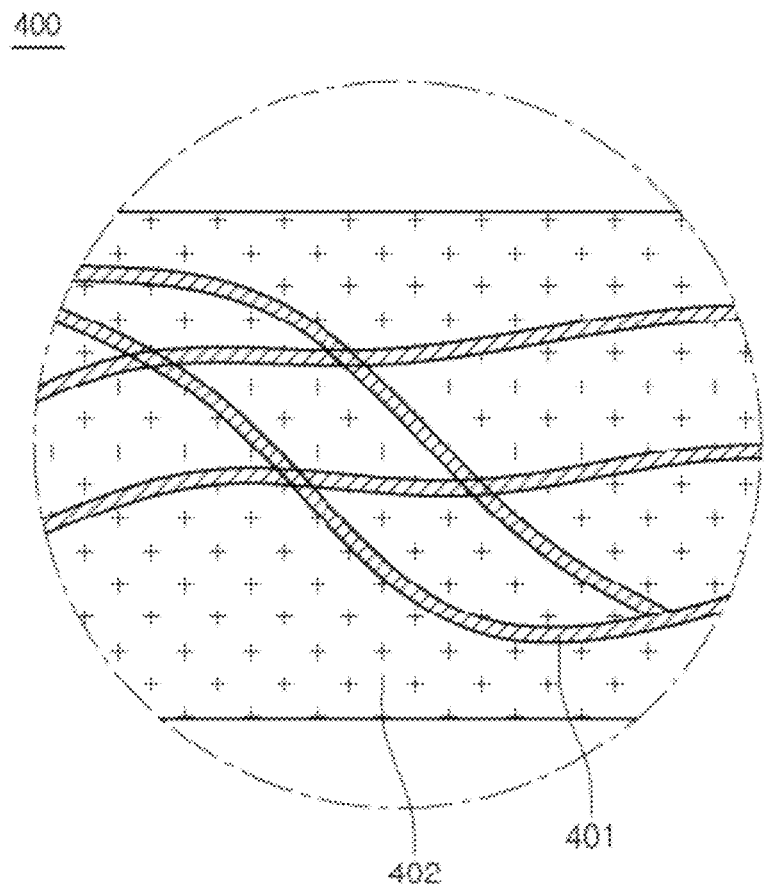
FIG. 4 is an exploded sectional view showing one section of a first spacer in another shape.

FIG. 1 is an exploded perspective view showing a camera module according to the embodiment. FIG. 2 is a perspective view showing the camera module according to the embodiment. FIG. 3 is a sectional view taken along line A-A' of FIG. 2. FIG. 4 is an exploded sectional view showing one section of a first spacer in another shape;

Referring to FIGS. 1 to 4, the camera module according to the embodiment includes a lens assembly 20 and a sensor part 10.

The lens assembly 20 collects external image light on the sensor part 10 to form an image. The lens assembly 20 includes a first lens unit 100, a second lens unit 200, an optical filter 300, a first spacer 400, a second spacer 500, a third spacer 600, and a light shielding part 700.

The first lens unit 100 is transparent and includes polymer. In detail, the first lens unit 100 may include transparent curable polymer. The first lens unit 100 may include curable polymer having high heat resistance.

The first lens unit 100 includes a first lens part 110 and a first support part 120.

The first lens part 110 has a curved surface with a predetermined curvature. In detail, the first lens part 110 has a convex surface 111 and a concaved surface 112 facing each other. The first lens part 110 refracts incident light. The first lens part 110 has a diameter of about 0.5 mm to about 5 mm.

The first support part 120 is provided in the vicinity of the first lens part 110. In detail, the first support part 120 surrounds the first lens part 110. In other words, the first support part 120 extends toward side portion of the first lens unit 100 from the first lens part 110. The first support part 120 supports the first lens part 110.

The first support part 120 may have a plate shape. The first support part 120 is integrally formed with the first lens part 110. The first support part 120 may have a rectangular shape when viewed in a plan view. A width W1 of the first support part 120 may be in the range of about 3 mm to about 10 mm.

The second lens unit 200 is provided on the first lens unit 100. The second lens unit 200 is spaced apart from the first lens unit 200 by a predetermined interval. An outer portion of the second lens unit 200 may be aligned in line with an outer portion of the first lens unit 100. A lateral surface of the second lens unit 200 may be aligned with a lateral surface of the first lens unit 100 on the same plane. In other words, the lateral surfaces of the second and first lens units 200 and 100 may be cutting surfaces formed when the second and first lens units 200 and 100 are cut at the same time.

The second lens unit 200 includes a second lens part 210 and a second support part 220.

The second lens part 210 corresponds to the first lens part 110. For example, the center of the second lens part 210 may correspond to the center of the first lens part 110. In other words, the center of the second lens part 210 is substantially coincident with the center of the first lens part 110.

The second lens part 210 has a curved surface with a predetermined curvature. In detail, the second lens part 210 has a convex surface 211 and a concaved surface 212 facing each other. The second lens part 210 refracts incident light. The second lens part 210 has a diameter of about 0.5mm to about 5 mm.

The second support part 220 is provided in the vicinity of the second lens part 210. In detail, the second support part 220 surrounds the second lens part 210. In other words, the second support part 220 extends toward side portions of the second lens unit 200 from the second lens part 210. The second support part 220 supports the second lens part 210.

The second support part 220 may have a plate shape. The second support part 220 is integrally formed with the second lens part 210. The second support part 220 may have a rectangular shape when viewed in a plan view. A width W2 of the second support part 220 may be in the range of about 3 mm to about 10 mm.

The first and second lens units 100 and 200 are transparent and include polymer. In detail, the first and second lens units 100 and 200 may include transparent curable polymer. The first and second lens units 100 and 200 may include curable polymer having high heat resistance.

The first and second units 100 and 200 may include the same material, or different materials.

The polymer constituting the first and second lens units 100 and 200 is rarely deformed at the temperature of about 200° C. to about 350° C. For example, the glass transition temperature of the polymer constituting the first and second lens units 100 and 200 may be in the range of about 140° C. to about 600° C.

The first and second lens units 100 and 200 may include thermosetting resin or photo-curable resin. The material constituting the first and second lens units 100 and 200 may include silicon-based resin, acryl-based resin, epoxy-based resin or urethane-based resin.

Although the present embodiment has been described about the cameral module including two lens units 100 and 200, the present invention is not limited thereto. The camera module according to the embodiment may include at least three lens units.

The optical filter 300 is provided below the first lens unit 100. The optical filter 300 includes an infrared filter to filter an infrared ray. The optical filter 300 may be formed by coating a plastic substrate or a glass substrate with a material to filter an infrared ray.

The optical filter 300 filters light passing therethrough to cut off the infrared ray. The optical filter 300 may adhere to both the second spacer 500 and the third spacer 600. The lateral surface of the optical filter 300 may be aligned with the lateral surface of the first lens unit 100 on the same plane. In other words, the lateral surface of the optical filter 300, the lateral surface of the first lens unit 100, and the lateral surface of the second lens unit 200 are cutting surfaces formed by cutting the optical filter 300, the first lens unit 100, and the second lens unit 200 at the same time.

The first spacer 400 is interposed between the first lens unit 100 and the second lens unit 200. The first spacer 400 is provided at the upper portion of the first lens unit 100. The positions of the upper and lower portions of the first lens unit 100 are determined according to the direction in which light is incident. In other words, light is incident through the upper portion of the first lens unit 100, and output through the lower portion of the first lens unit 100. In other words, the side of an object in the first lens unit 100 may be defined as the upper portion of the first lens unit 100, an opposite side to the object in the first lens unit 100 may be defined as the lower portion of the first lens unit 100. Similarly, the first spacer 400 is provided at a lower portion of the second lens unit 200.

The first spacer 400 adheres to both the first and second lens units 100 and 200. In detail, the first spacer 400 adheres to the top surface of the first lens unit 100 and the bottom surface of the second lens unit 200. In more detail, the first spacer 400 adheres to the top surface of the first support part 120 and the bottom surface of the second support part 220.

The outer portion of the first spacer 400 may be aligned in line with the outer portions of the first lens unit 100 and the second lens unit 200. In other words, the lateral surface of the first spacer 400 may be arranged together with the lateral surfaces of the first and second lens units 100 and 200 on the same plane.

The first spacer 400 may be transparent, semitransparent, or opaque. In particular, if the first spacer 400 is semitransparent or oblique, the first spacer 400 can effectively block light.

The first spacer 400 includes plastic. For example, the first spacer 400 may include color pigments such as black pigments and plastic. The first spacer 400 may include plastic having high heat resistance.

The first spacer 400 may include thermoplastic resin, thermosetting resin, or photo-curable resin. The first spacer 400 may include plastic, such as polyether ether ketone (PEEK), polytetrafluoroethylene (PTFE), polyimide (PI), or liquid crystal polymer, having high heat resistance.

The plastic used for the first spacer 400 is rarely deformed at the temperature of about 350° C. For example, the glass transition temperature of the plastic used for the first spacer 400 may be about 140° C. or more, in more detail, may be in the range of about 140° C. to about 500° C. A melting point of the plastic constituting the first spacer 400 is about 300° C. or more, in detail, in the range of about 300° C. to about 550° C.

In particular, as shown in the following experimental examples, PEEK, PTFE, PI, or liquid crystal polymer may have high heat resistance. The PEEK has the glass transition temperature of about 143° C., a melting point of about 343° C.

In addition, the PTFE has the glass transition temperature of about 300° C., and the melting point of about 327° C. In addition, the PI has the glass transition temperature of about 400° C.

Therefore, the plastic having the glass transition temperature of about 140° C. or more, in detail, the glass transition temperature of the about 140° C. to about 500° C. can represent high heat resistance. Similarly, the plastic having the melting point of about 300° C. or more, in detail, the melting point of about 300° C. to about 550° C. can represent high heat resistance.

The first spacer 400 may include plastic overall.

In addition, as shown in FIG. 4, the first spacer 400 may include a frame part 401 and a polymer part 402.

The frame part 401 may include inorganic fiber. In other words, the frame part 401 may include inorganic fiber having high heat resistance. The frame part 401 may include glass fiber. In other words, although the first spacer 400 includes polyester which is plastic representing low heat resistance, the deformation of the whole thickness can be reduced in the high-temperature process due to the glass fiber.

For example, the polymer part 402 may include polyester. In this case, the frame part 401 forms the frame of the first spacer 400, and the polymer part 402 can surround the frame part 401. In other words, the polyester can surround the glass fiber. In more detail, the first spacer 400 may include bulk molding compound (BMC).

In addition to the first spacer 400, the second spacer 500, the third spacer 600, and the light shielding part 700 may include a frame part and a polymer part surrounding the frame part.

Figure 5:
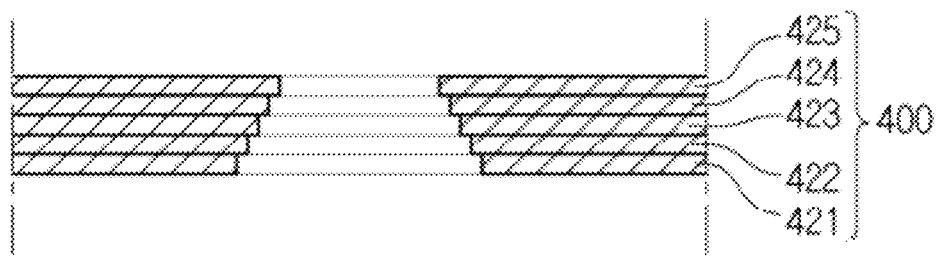
FIG. 5 is a sectional view showing the section of the first spacer according to another embodiment.
Figure 6:
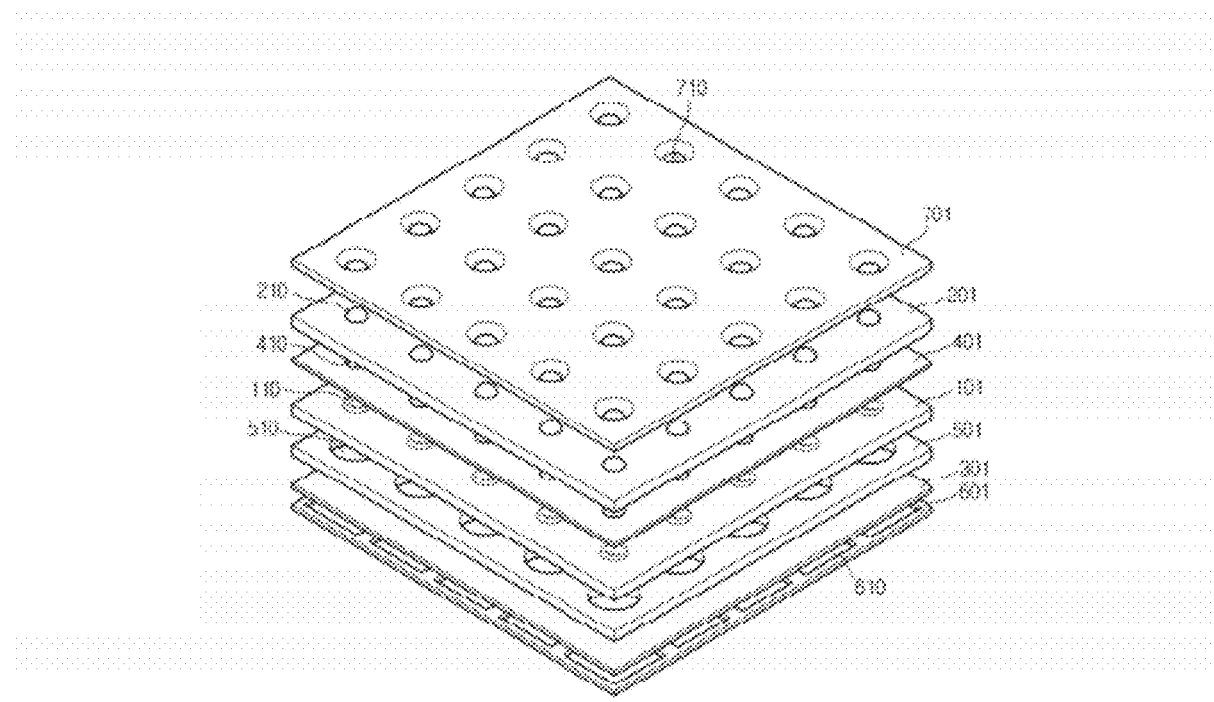
FIGS. 6 to 9 are views showing the manufacturing process of the camera module according to the embodiment.

The first spacer 400 may have a single layer structure or a multiple layer structure. For example, as shown in FIG. 5, the first spacer 400 may include a plurality of layers. In other words, the first spacer 400 may be formed by laminating a plurality of sheets 421, 422, 423, 424, and 425. In this case, the sheets 421, . . . , and 425 may include the above material. In addition, the sheets 421, 422, 423, 424, and 425 may include a frame part and a polymer part surrounding the frame part.

In this case, adhesion layers (not shown) are interposed between the sheets 421, 422, 423, 424, and 425. The sheets 421, 422, 423, 424, and 425 may adhere to each other through the adhesion layers.

If the first spacer 400 has a single layer structure, the thickness of the first spacer 400 may be in the range of about 50 μm to about 250 μm. If the first spacer 400 has a multiple layer structure, each of the sheets 421, 422, 423, 424, and 425 may be in the range of about 50 μm to about 250 μm.

In particular, if the first spacer 400 and the sheets 421, 422, 423, 424, and 425 include PI, and if the first spacer 400 has the above thickness range, the first spacer 400 and the sheets 421, 422, 423, 424, and 425 may be less deformed at the high temperature as shown in the following experimental examples.

In addition, as shown in the following experimental examples, although the first spacer 400 and the sheets 421, 422, 423, 424, and 425 have the thickness of about 250 μm when the first spacer 400 and the sheets 421, 422, 423, 424, and 425 include PTFE, the first spacer 400 and the sheets 421, 422, 423, 424, and 425 may be less deformed.

In addition, as shown in the following experimental examples, although the first spacer 400 and the sheets 421, 422, 423, 424, and 425 have the thickness of about 50 μm to about 280 μm when the first spacer 400 and the sheets 421, 422, 423, 424, and 425 include PTFE, the first spacer 400 and the sheets 421, 422, 423, 424, and 425 may be less deformed.

In addition, as shown in the following experimental examples, although the first spacer 400 and the sheets 421, 422, 423, 424, and 425 have the thickness of about 50 μm to about 300 μm when the first spacer 400 and the sheets 421, 422, 423, 424, and 425 include PEEK, the first spacer 400 and the sheets 421, 422, 423, 424, and 425 may be less deformed.

The materials constituting the adhesion layers represent high heat resistance. For example, the material constituting the adhesion layers is rarely deformed even at the temperature of about 350° C. or less. The materials constituting the adhesion layers may include plastic having the glass transition temperature of about 130° C. to about 250° C. Preferably, the adhesion layers may include plastic having the glass transition temperature of about 200° C. to about 250° C. In addition, the adhesion layers may include plastic having a melting point of about 350° C. to about 450° C.

The materials constituting the adhesion layers may include epoxy-based resin or acrylic-based resin.

In addition, the thickness of the first spacer 400 may be in the range of about 70 μm to about 1000 μm.

The first spacer 400 includes a first transmission hole 410. The first transmission hole 410 corresponds to the first and second lens parts 110 and 210. The center of the first transmission hole 410 may be substantially coincident with the centers of the first and second lens parts 110 and 210.

The internal lateral surface of the first transmission hole 410 may be inclined to the top surface of the first spacer 400. In this case, the internal lateral surface of the first transmission hole 410 may be inclined to the top surface of the first spacer 400 at an angle of about 40° to about 40°.

The inclination direction of the internal lateral surface of the first transmission hole 410 is substantially identical to the path of the incident light. Accordingly, the angle of the lateral surface of the first transmission hole 410 may vary depending on the optical design of the first and second lens units 100 and 200.

The diameter of the first transmission hole 410 may be reduced as the first transmission hole 410 is away from the first lens unit 100. Differently, the diameter of the first transmission hole 410 may be increased as the first transmission hole 410 is away from the first lens unit 100.

The connection part between the internal lateral surface of the first transmission hole 410 and the bottom surface of the first spacer 400 may correspond to the boundary between the first lens part 110 and the first support part 120. In addition, the connection part between the internal lateral surface of the first transmission hole 410 and the top surface of the first spacer 400 may correspond to the boundary between the second lens part 210 and the second support part 220.

Since the internal lateral surface of the first transmission hole 410 is inclined to the top surface of the first spacer 400, the light passing through the second lens part 210 can be effectively incident into the first lens part 110. In particular, since the internal lateral surface of the first transmission hole 410 corresponds to the boundary between the first lens part 110 and the first support part 120 and the boundary between the second lens part 210 and the second support part 220, undesirable light to cause noise can be effectively removed by the first spacer 400.

The second spacer 500 is interposed between the first lens unit 100 and the optical filter 300. The second spacer 500 adheres to the first lens unit 100 and the optical filter 300. In particular, the second spacer 500 adheres to the bottom surface of the first lens unit 100 and a top surface of the optical filter 300. In detail, the second spacer 500 adheres to a bottom surface of the first support part 120 and the top surface of the optical filter 300.

The outer portion of the second spacer 500 may be aligned in line with the outer portions of the first and second lens units 100 and 200. In other words, the lateral surface of the second spacer 500 may be aligned together with the lateral surfaces of the first and second lens units 100 and 200 on the same plane.

The second spacer 500 is opaque, and includes plastic. The second spacer 500 may include the same material as that of the first spacer 400. For example, the second spacer 500 may include color pigments such as black pigments and plastic. The second spacer 500 may include plastic having high heat resistance.

The above material constituting the first spacer 400 may constitute the second spacer 500.

Similarly, the second spacer 500 may include plastic overall. In addition, the second spacer 500 may have a single layer structure or a multiple layer structure.

The second spacer 500 includes a second transmission hole 510. The second transmission hole 510 corresponds to the first and second lens parts 110 and 210. The center of the second transmission hole 510 may be substantially coincident with the centers of the first and second lens parts 110 and 210.

The internal lateral surface of the second transmission hole 510 may be inclined to the top surface of the second spacer 500. In this case, the internal lateral surface of the second transmission hole 510 may be inclined to the top surface of the second spacer 500 at an angle of about 40° to about 60°.

The inclination direction of the internal lateral surface of the second transmission hole 510 may be substantially identical to the path of the incident light. Accordingly, the angle of the lateral surface of the second transmission hole 510 may vary depending on the optical design of the first lens unit 100.

The diameter of the second transmission hole 510 may be increased as the second transmission hole 510 is away from the first lens unit 100. In addition, the diameter of the second transmission hole 510 may be reduced as the second transmission hole 510 is away from the first lens unit 100.

The connection part between the internal lateral surface of the second transmission hole 510 and the top surface of the second spacer 500 may correspond to the boundary between the first lens part 110 and the first support part 120.

Since the internal lateral surface of the second transmission hole 510 is inclined to the top surface of the second spacer 500, the light passing through the first lens part 110 can be effectively incident onto the optical filter 300. In particular, since the internal lateral surface of the second transmission hole 510 corresponds to the boundary between the first lens part 110 and the first support part 120, the undesirable light to cause noise can be effectively removed by the second spacer 500.

The third spacer 600 is provided blow the optical filter 300. The third spacer 600 may be interposed between the optical filter 300 and the sensor part 10. The third spacer 600 adheres to the bottom surface of the optical filter 300.

The outer portion of the third spacer 600 may be aligned in line with the outer portion of the optical filter 300. In other words, the lateral surface of the third spacer 600 may be aligned together with the lateral surface of the optical filter 300 on the same plane.

The third spacer 600 is opaque and includes plastic. The third spacer 600 may include the same material as that of the first and second spacers 400 and 500. The third spacer 600 includes plastic having high heat resistance. For example, the plastic constituting the third spacer 600 is rarely deformed at the temperature of about 350° C. or less. The above material constituting the first spacer 400 may constitute the third spacer 600.

Similarly, the third spacer 600 may include plastic overall. In addition, the third spacer 600 may have a single layer structure or a multiple layer structure.

The third spacer 600 includes a third transmission hole 610. The third transmission hole 610 corresponds to the first and second lens parts 110 and 210. The center of the third transmission hole 610 may be substantially coincident with the centers of the first and second lens parts 110 and 210.

The internal lateral surface of the third transmission hole 610 may be inclined to the top surface of the third spacer 600. In this case, the internal lateral surface of the third transmission hole 610 may be inclined to the top surface of the third spacer 600 at an angle of about 40° to about 80°.

The inclination direction of the internal lateral surface of the third transmission hole 610 is substantially identical to the path of the incident light. Accordingly; the angle of the lateral surface of the third transmission hole 610 may vary depending on the optical design of the first and second lens units 100 and 200.

The diameter of the third transmission hole 610 may be increased as the third transmission hole 610 is away from the optical filter 300. In addition, the diameter of the third transmission hole 610 may be reduced as the third transmission hole 610 is away from the optical filter 300.

Since the internal lateral surface of the third transmission hole 610 is inclined to the top surface of the third spacer 600, the light passing through the optical filter 300 can be effectively incident into the sensor part 10.

The light shielding part 700 is provided on the second lens unit 200. The light shielding part 700 may adhere onto the second lens unit 200. In detail, the light shielding part 700 may adhere to the top surface of the second support part 220.

The outer portion of the light shielding part 700 may be aligned in line with the outer portions of the first and second lens units 100 and 200. In other words, the lateral surface of the light shielding part 700 may be aligned together with the lateral surfaces of the first and second lens units 100 and 200 on the same plane.

The light shielding part 700 includes opaque and includes plastic. For example, the light shielding part 700 may include color pigments such as black pigments and plastic. The light shielding part 700 may include plastic having high resistance. For example, the plastic constituting the light shielding part 700 is rarely deformed at the temperature of about 350° C. or less. The above material constituting the first spacer 400 may constitute the light shielding part 700.

Similarly, the light shielding part 700 may include plastic overall. In addition, the light shielding part 700 may have a single layer structure or a multiple layer structure.

The light shielding part 700 includes a fourth transmission hole 710. The fourth transmission hole 710 corresponds to the first and second lens parts 110 and 210. The center of the fourth transmission hole 710 may be substantially coincident with the centers of the first and second lens parts 110 and 210.

The internal lateral surface of the fourth transmission hole 710 may be inclined to the top surface of the light shielding part 700. In this case, the internal lateral surface of the fourth transmission hole 710 may be inclined to the top surface of the fourth transmission hole 710 at an angle of about 30° to about 70°.

The inclination direction of the internal lateral surface of the fourth transmission hole 710 is substantially identical to the path of the incident light. Accordingly, the angle of the lateral surface of the fourth transmission hole 710 may vary depending on the optical design of the second lens unit 200.

The diameter of the fourth transmission hole 710 may be increased as the fourth transmission hole 710 is away from the first lens unit 100.

The connection part between the internal lateral surface of the fourth transmission hole 710 and the bottom surface of the light shielding part 700 may correspond to the boundary between the second lens part 210 and the second support part 220.

Since the internal lateral surface of the fourth transmission hole 710 is inclined to the top surface of the light shielding part 700, external light can be effectively incident onto the second lens part 210. In particular, the internal lateral surface of the fourth transmission hole 710 corresponds to the boundary between the second lens part 210 and the second support part 220, the undesirable light to cause noise can be effectively removed by the light shielding part 700.

The first spacer 400, the second spacer 500, the third spacer 600, and the light shielding part 700 may adhere to the first lens unit 100, the second lens unit 200, and the optical filter 300 through adhesion layers.

The sensor part 10 is provided below the lens assembly 20. The sensor part 10 may adhere to the lens assembly 20. The sensor part 10 senses incident light through the lens assembly 20. The sensor part 10 includes a sensing chip 11 and a circuit board 12.

The sensing chip 11 converts the light incident thereon through the lens assembly 20 into an electrical signal. The sensing chip 11 is connected to the circuit board 12. The sensing chip 11 may include various semiconductor devices to sense images. The sensing chip 11 may include a semiconductor chip including silicon.

The circuit board 12 is electrically connected to the sensing chip 11. The circuit board 12 receives the electrical signal applied from the sensing chip 11. The circuit board 12 can drive the sensing chip 11.

In the camera module according to the embodiment, the first spacer 400, the second spacer 500, and the third spacer 600, which are opaque, adhere to the first lens unit 100, the second lens unit 200, and the optical filter 300. Accordingly, the first spacer 400, the second spacer 500, and the third spacer 600 adjust distances between the first lens unit 100, the second lens unit 200, and the optical filter 300 while inhibiting undesirable light to cause noise. Therefore, the camera module according to the embodiment represents a high optical characteristic in a simple structure.

In addition, since the physical properties of polymer constituting the first and second lens units 100 and 200 are similar to that of the typical plastic, the first and second spacers 400 and 500 can securely adhere to the first and second lens units 100 and 200. In other words, since the spacers 400, 500, and 600, the lens units 100 and 200, and the adhesion layers include polymer including plastic, the lens units 100 and 200, and the spacers 400, 500, and 600 may very securely adhere to each other.

As described above, the first lens unit 100, the second lens unit 200, the optical filter 300, the first spacer 400, the second spacer 500, the third spacer 600, and the light shielding part 700 adhere to each other by higher adhesion strength. In addition, the sensor part 10 adheres to the third spacer 600. Therefore, the lens assembly 20 represents high mechanical strength. Therefore, the camera module according to the embodiment can maintain high strength without an additional housing.

However, the camera module according to the embodiment may further include a housing (not shown) receiving the lens assembly 20 and the sensor part 10 in order to more enhance the strength. The housing may guide the lens assembly 20 and the sensor part 10. In addition, the housing may include a light shielding cover to inhibit light, which is incident onto the lateral surface of the lens assembly 20 and the sensor part 10, from being shielded.

In addition, the camera module according to the embodiment may include a light shielding layer. In other words, the lateral surfaces of the lens assembly 20 and the sensor part 10 are coated with opaque materials representing the high heat resistance, thereby forming the light shielding layer.

The first lens unit 100, the second lens unit 200, the optical filter 300, the first spacer 400, the second spacer 500, the third spacer 600, the light shielding layer, and the adhesion layers have high heat resistance.

Therefore, the camera module according to the embodiment can represent high heat resistance. Therefore, the camera module according to the embodiment is not deformed in the high-temperature reflow process to bond the camera module to the main substrate.

FIGS. 6 to 9 are views showing the manufacturing process of the camera module according to the embodiment. The present manufacturing method will be described by making reference to the above description about the camera module. In other words, the above description about the camera module will be incorporated in the description about the present manufacturing method.

Figure 7:
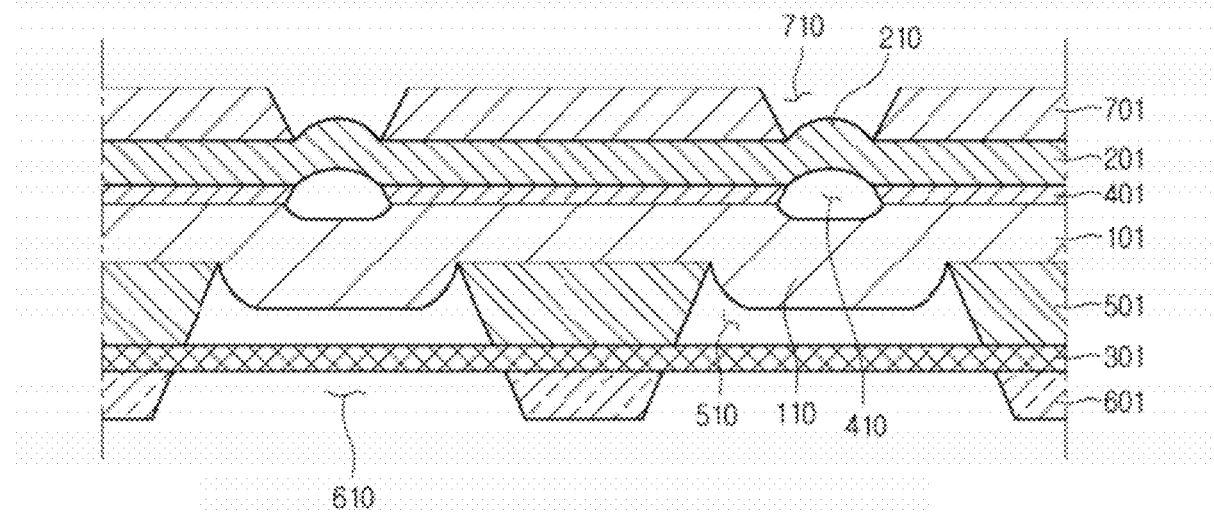

Referring to FIG. 7, a first lens array substrate 101, a second lens array substrate 201, an optical filter plate 301, a first film 401, a second film 501, a third film 601, and a fourth film 701 are formed.

The first lens array substrate 101 includes a plurality of first lens parts 110 having curved surfaces. The first lens array substrate 101 includes the same material as that of the first lens unit 100 in the above camera module.

The second lens array substrate 201 includes a plurality of second lens parts 210 having curved surfaces. The second lens array substrate 201 includes the same material as that of the second lens unit 200 in the above camera module.

The optical filter plate 310 has the same structure as that of the above optical filter 300. In other words, the optical filter plate 301 has the same optical characteristics and thickness as those of the optical filter 300.

The first film 401 includes a plurality of first transmission holes 410. The first film 401 includes the same material as that of the first spacer 400 in the above camera module. In addition, the thickness of the first film 401 is equal to the thickness of the first spacer 400.

The second film 501 includes a plurality of second transmission holes 510. The second film 501 includes the same material as that of the second spacer 500 in the above camera module. In addition, the thickness of the second film 501 is equal to the thickness of the second spacer 500.

The third film 601 includes a plurality of three transmission holes 610. The third film 601 includes the same material as that of the third spacer 600 in the above camera module. In addition, the thickness of the third film 601 is equal to the thickness of the third spacer 600.

The fourth film 701 includes a plurality of fourth transmission holes 710. The fourth film 701 includes the same material as that of the light shielding part 700 in the above camera module. In addition, the thickness of the fourth film 701 is equal to that of the light shielding part 700.

Referring to FIG. 7, the first lens parts 110, the second lens parts 210, the first transmission holes 410, the second transmission holes 510, the third transmission holes 610, and the fourth transmission holes 710 are aligned with each other.

In this state, the third film 601, the optical filter plate 301, the second film 501, the first lens array substrate 101, the first film 401, the second lens array substrate 201, and the fourth film 701 are sequentially stacked on each other and adhere to each other.

Figure 8:
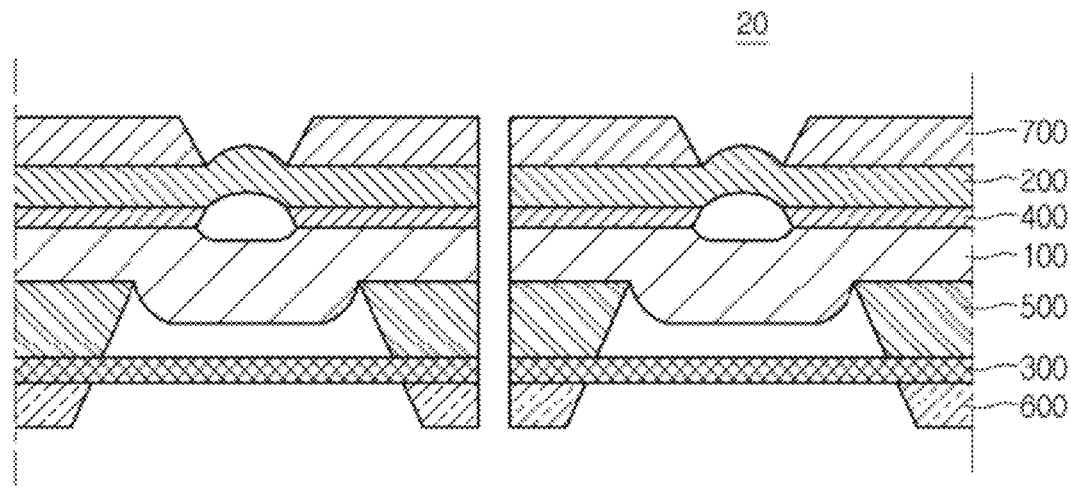

Referring to FIG. 8, the third film 601, the optical filter plate 301, the second film 501, the first lens array substrate 101, the first film 401, the second lens array substrate 201, and the fourth film 701 are simultaneously cut, so that a plurality of lens assemblies 20 are formed.

In other words, the first lens array substrate 101 is cut in a square shape or a rectangular shape, so that the first lens array substrate 101 is divided into a plurality of first lens units 100.

Similarly, the second lens arrays substrate 201, the optical filter plate 301, the first film 401, the second film 501, the third film 601, and the fourth film 701 are divided into a plurality of second lens units 200, a plurality of optical filters 300, a plurality of first spacers 400, a plurality of second spacers 500, a plurality of spacers 600, and a plurality of light shielding parts 700, respectively.

In addition, the third film 601 and the optical filter plate 301 may separately adhere to each other and cut. In addition, the second film 501, the first lens array substrate 101, the first film 401, the second lens array substrate 201, and the fourth film 701 may be sequentially stacked on each other, adhere to each other, and cut. Thereafter, the optical filters 300 adhere to the second spacers 500, so that the lens assemblies 20 according to the embodiment may be formed.

Figure 9:
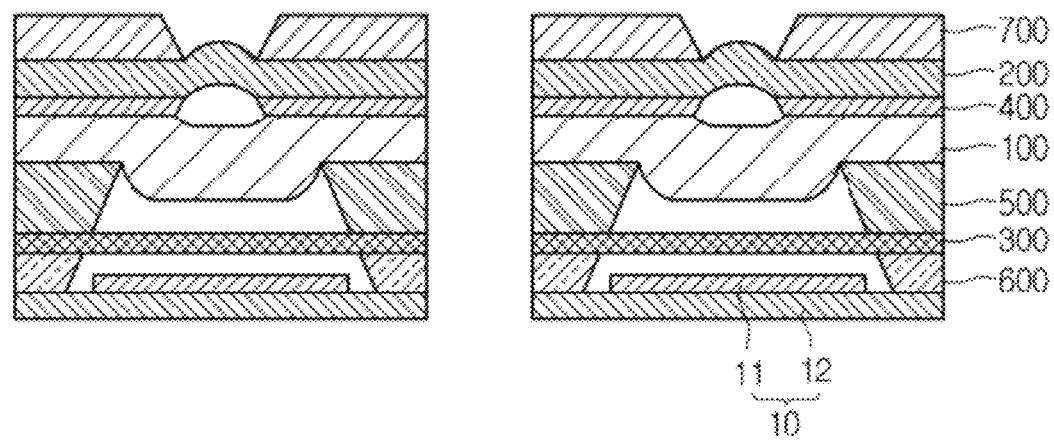

Referring to FIG. 9, the sensor parts 10 adhere to the lens assemblies 20, and the camera module according to the embodiment is formed.

As described above, since the third film 601, the optical filter plate 301, the second film 501, the first lens array substrate 101, the first film 401, the second lens array substrate 201, and the fourth film 701 are cut simultaneously, the first lens unit 100, the second lens unit 200, the optical filter 300, the first spacer 400, the second spacer 500, the third spacer 600, and the light shielding part 700 have the same cutting plane.

In addition, if the third film 601, the optical filter plate 301, the second film 501, the first lens array substrate 101, the first film 401, the second lens array substrate 201, and the fourth film 701 include plastic, since they have a similar mechanical property, they can be cut.

Therefore, according to the manufacturing method of the embodiment, the lens assemblies 20 can be easily manufactured, and the camera module having improved heat resistance, a mechanical characteristic, and an optical characteristic can be easily provided.

Figure 10:
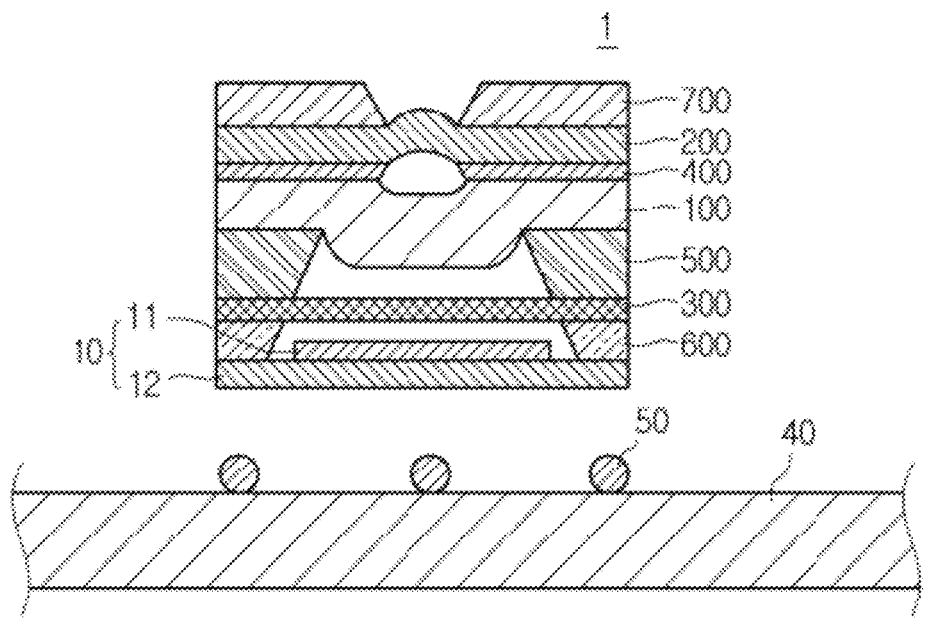
FIGS. 10 and 11 are views showing the procedure in which the camera module according to the embodiment is bonded to a main circuit board.
Figure 11:
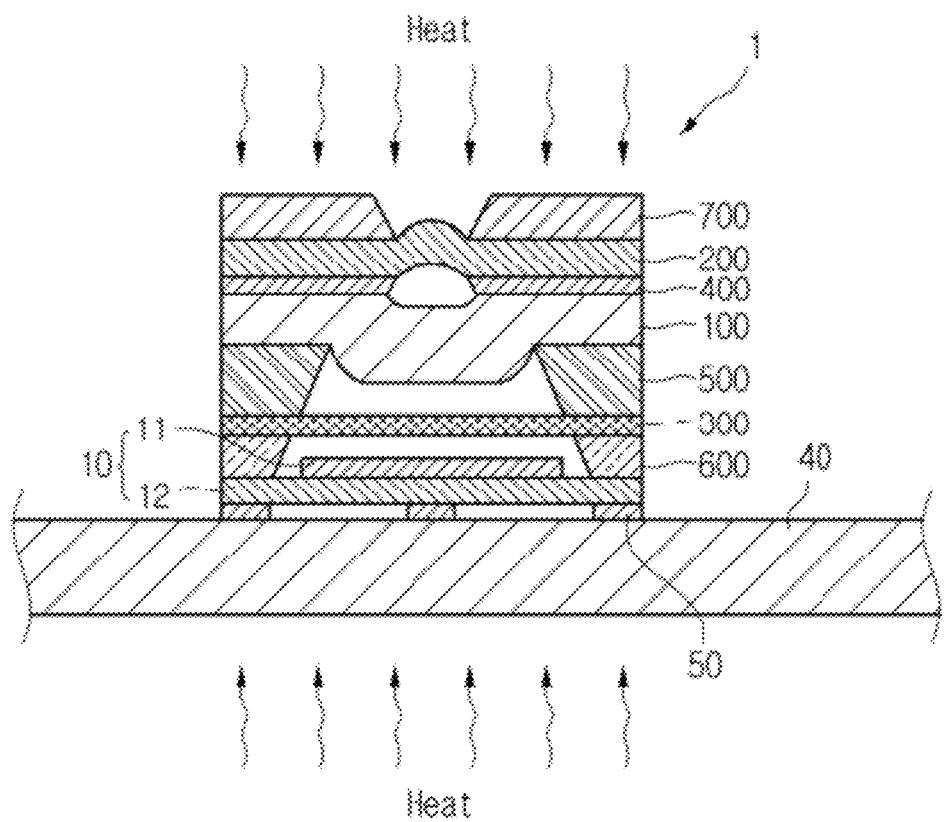

FIGS. 10 and 11 are views showing a process of bonding a camera module 1 according to the embodiment to the main substrate 40.

Referring to FIG. 10, a plurality of solders 50 are arranged on the main substrate 40. Thereafter, the camera module 1 according to the embodiment can be arranged on the solders 50.

Referring to FIG. 11, the camera module 1 according to the embodiment is arranged on the solders 50. The solders 50, the main substrate 40, and the camera module 1 according to the embodiment are heated.

Therefore, the temperatures of the solders 50 and the camera module 1 according to the embodiment may be increased about 200° C. to about 300° C. Therefore, the solders 50 are softened, and the camera module 1 according to the embodiment adheres to the main substrate 40. Such a reflow process can be performed for about 3 minutes.

Figure 12:
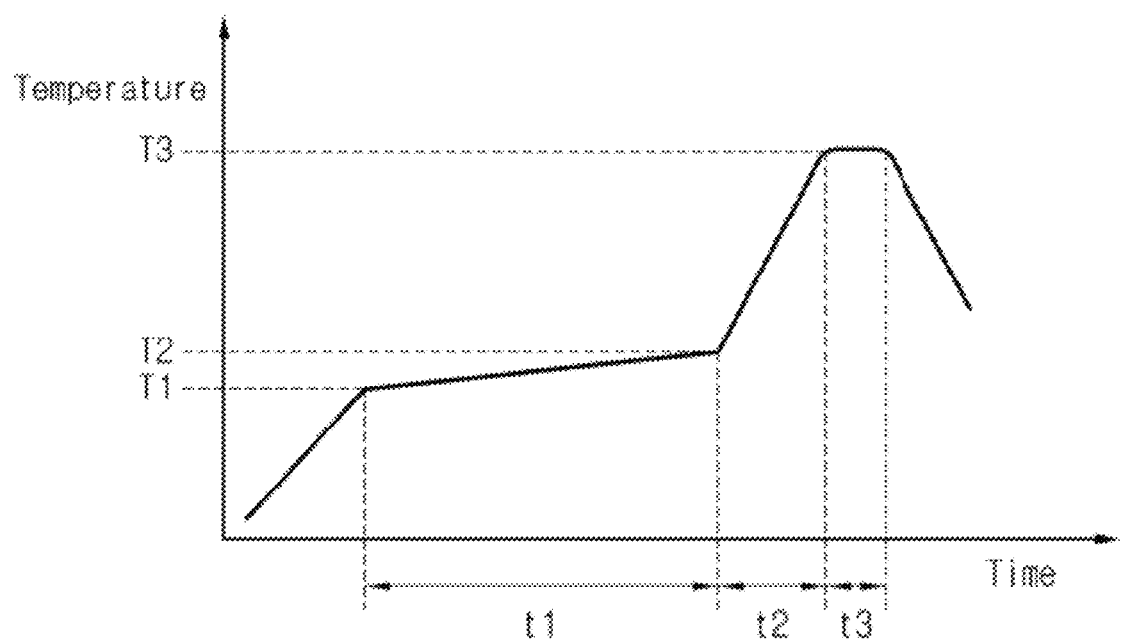
FIG. 12 is a graph showing temperature variation in a reflow process according to the embodiment.

As shown in FIG. 12, the reflow process can be performed as follows.

After the temperatures of the main substrate 40, the camera module 1, and the solders 50 have been rapidly increased to the temperature of T1, the temperatures of the main substrate 40, the camera module 1, and the solders 50 are slowly increased to the temperature of T2 for about time of t1. Thereafter, after the temperatures of the main substrate 40, the camera module 1, and the solders 50 have been rapidly increased to the temperature of T3 for the time of t2, the temperatures of the main substrate 40, the camera module 1, and the solders 50 are maintained for the time of t3. Thereafter, the main substrate 40, the camera module 1, and the solders 50 are cooled.

In this case, the T1 is in the range of about 140° C. to about 160° C., and the T2 is in the range of about 190° C. to about 210° C. In addition, the T3 is in the range of about 240° C. to about 270° C. In addition, the t1 may be in the range of about 60 seconds to about 120 seconds, and the t2 may be in the range of about 15 seconds to about 60 seconds. In addition, the t3 may be in the range of about 20 seconds to about 30 seconds.

In this case, since the camera module 1 according to the embodiment represents high heat resistance, deformation does not occur in the reflow process. In the reflow process, the camera module 1 according to the embodiment is not deformed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

EXPERIMENTAL EXAMPLE #1

In following table 1, PEEK, LCP, PTFE, BMC, and PI samples having predetermined thickness was prepared. Thereafter, the samples are put into an oven and subject to heat treatment at the temperature of about 250° C. for about 3 minutes. The thickness deviations of the samples after and before the heat treatment are shown in table 1.

TABLE 1

| Sample | Thickness (μm) | Thickness Deviation |
|--------|----------------|---------------------|
| PEEK | about 100, 200, 300 | Within 1 μm |
| LCP | about 100 | Within 2 μm |

TABLE 1-continued

| Sample | Thickness (μm) | Thickness Deviation |
|---|---|---|
| PTFE | about 230 | Within 2 μm |
| BMC | about 260 | Within 2 μm |
| PI | about 100 | Within 1 μm |

In the above table 1, since the thickness deviation caused by the deformation of each sample is about 2 μm, the samples are suitably applicable to the spacers of the camera module.

EXPERIMENTAL EXAMPLE #2

PI samples having the thickness shown in following table 1 were prepared. The PI samples were put into the oven and subject to heat treatment under the same condition as that of experiment example #1. The thickness deviations of the PI samples before and after the heat treatment are shown in table 2.

TABLE 2

| Thickness (μm) | Thickness Deviation |
|---|---|
| about 100 | Within 1 μm |
| about 200 | Within 1 μm |
| about 300 | Within 3 μm to 5 μm |

As shown in table 2, when the PI sample has the thickness of about 300 μm, the thickness deviation is increased.

What is claimed is:

1. A lens assembly comprising:
a lens unit; and
a spacer at an upper portion or a lower portion of the lens unit,
wherein the spacer includes polymer having a glass transition temperature of about 140° C. to about 500° C.,
wherein the spacer comprises a frame part and a polymer part,
wherein the frame part comprises a plurality of inorganic fibers and forms a frame of the spacer and the polymer part fills voids among the plurality of inorganic fibers, the polymer part having a heat resistance lower than that of the inorganic fibers;
wherein the lens unit comprises a first lens unit and a second lens unit on the first lens unit,
wherein the first lens unit comprises a first concave surface on a top surface of the first lens unit, and
wherein the second lens unit comprises a second concave surface on a bottom surface of the second lens unit.

2. The lens assembly of claim 1, wherein the polymer includes polyimide.

3. The lens assembly of claim 1, wherein the spacer includes a plurality of sheets stacked on each other, and the sheets include polymer.

4. The lens assembly of claim 3, wherein the sheets include polyimide, and thickness of about 50 μm to about 250 μm.

5. The lens assembly of claim 3, wherein the sheets include polyether ether ketone, and have a thickness of about 50 μm to about 300 μm.

6. The lens assembly of claim 3, wherein the sheets include polytetrafluoroethylene and have a thickness of about 50 μm to about 260 μm.

7. The lens assembly of claim 1, wherein the polymer includes polyether ether ketone.

8. The lens assembly of claim 1, wherein the polymer includes liquid crystal polymer.

9. The lens assembly of claim 1, wherein the spacer includes a transmission hole corresponding to the lens unit, and
wherein a top portion of the transmission hole is disposed at a position higher than a top surface of the spacer.

10. The lens assembly of claim 1, wherein the spacer comprises a first spacer between the first lens unit and the second lens unit,
wherein the first spacer comprises a first transmission hole, and
wherein the first transmission hole is disposed between the first concave surface and the second concave surface.

11. A camera module comprising:
a first lens unit;
a second lens unit on the first lens unit;
a first spacer interposed between the first and second lens units, wherein the first spacer includes polyimide;
a light shielding part on the second lens unit; and
a second spacer below the first lens unit;
wherein the first spacer comprises a first frame part and a first polymer part,
wherein the first frame part comprises a plurality of inorganic fibers and forms a frame of the first spacer and the first polymer part fills voids among the plurality of inorganic fibers, the first polymer part having a heat resistance lower than that of the inorganic fibers; and
wherein a thickness of the second spacer is greater than a thickness of the first spacer.

12. The camera module of claim 11, wherein lateral surfaces of the first and second lens units and a lateral surface of the first spacer are arranged on a same plane.

13. The camera module of claim 12, wherein the first and second lens units include transparent polymer, and the first spacer is opaque.

14. The camera module of claim 11, further comprising
an optical filter below the second spacer; and
a third spacer below the optical filter;
wherein the light shielding part, the second spacer, and the third spacer each includes polyimide; and
wherein the second spacer, the third spacer, and the light shielding part each includes a second frame part and a corresponding second polymer part surrounding the second frame part; and
wherein a thickness of the second spacer is greater than a thickness of the third spacer.

15. A camera module comprising:
a first lens unit;
a second lens unit on the first lens unit;
a spacer interposed between the first and second lens units; and
a light shielding part on the second lens unit;
wherein the spacer comprises a first spacer between the first lens unit and the second lens unit and a second spacer below the first lens unit:
wherein the spacer includes a frame part and a polymer part,
wherein the frame part comprises a plurality of inorganic fibers and forms a frame of the spacer and the polymer part fills voids among the plurality of inorganic fibers, the polymer part having a heat resistance lower than that of the inorganic fibers;
wherein the first lens unit comprises a first concave surface on a top surface of the first lens unit;
wherein the second lens unit comprises a second concave surface on a bottom surface of the second lens unit; and
wherein a thickness of the second spacer is greater than a thickness of the first spacer.

16. The camera module of claim 15, wherein the spacer includes a plurality of sheets stacked on each other, and each sheet includes the frame part and the polymer part.

17. The lens assembly of claim 15, wherein the first spacer comprises a first transmission hole.

18. The lens assembly of claim 17, wherein the first transmission hole is disposed between the first concave surface and the second concave surface.

* * * * *